United States Patent
Bruhn et al.

(10) Patent No.: US 12,167,219 B2
(45) Date of Patent: Dec. 10, 2024

(54) AUDIO PROCESSING IN IMMERSIVE AUDIO SERVICES

(71) Applicants: DOLBY LABORATORIES LICENSING CORPORATION, San Francisco, CA (US); DOLBY INTERNATIONAL AB, Amsterdam Zuidoost (NL)

(72) Inventors: Stefan Bruhn, Sollentuna (SE); Juan Felix Torres, Darlinghurst (AU); David S. McGrath, Rose Bay (AU); Brian B. Lee, San Francisco, CA (US)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 0 days.

(21) Appl. No.: 17/292,457

(22) PCT Filed: Nov. 12, 2019

(86) PCT No.: PCT/US2019/060855
§ 371 (c)(1),
(2) Date: May 10, 2021

(87) PCT Pub. No.: WO2020/102153
PCT Pub. Date: May 22, 2020

(65) Prior Publication Data
US 2022/0022000 A1 Jan. 20, 2022

Related U.S. Application Data

(60) Provisional application No. 62/797,563, filed on Jan. 28, 2019, provisional application No. 62/795,236, (Continued)

(51) Int. Cl.
H04S 7/00 (2006.01)
H04R 3/00 (2006.01)
H04R 5/027 (2006.01)

(52) U.S. Cl.
CPC ............... H04S 7/30 (2013.01); H04R 3/005 (2013.01); H04R 5/027 (2013.01); *H04S 2400/03* (2013.01)

(58) Field of Classification Search
None
See application file for complete search history.

(56) References Cited

U.S. PATENT DOCUMENTS 5,521,981 A * 5/1996 Gehring ................. H04S 1/002
  381/26
5,930,451 A  7/1999 Ejiri
(Continued)

FOREIGN PATENT DOCUMENTS

CN  105792086 A  2/2019
GB  2366975 A  3/2002
(Continued)

OTHER PUBLICATIONS

Ariza, O. et al."Analysis of Proximity-Based Multimodal Feedback for 3D Selection in Immersive Virtual Environments" IEEE Conference on Virtual Reality and 3D User Interfaces, Mar. 2018, pp. 327-334.
(Continued)

Primary Examiner — Duc Nguyen
Assistant Examiner — Assad Mohammed

(57) ABSTRACT

The disclosure herein generally relates to capturing, acoustic pre-processing, encoding, decoding, and rendering of directional audio of an audio scene. In particular, it relates to a device adapted to modify a directional property of a captured directional audio in response to spatial data of a
(Continued)

microphone system capturing the directional audio. The disclosure further relates to a rendering device configured to modify a directional property of a received directional audio in response to received spatial data.

28 Claims, 3 Drawing Sheets

Related U.S. Application Data filed on Jan. 22, 2019, provisional application No. 62/793,666, filed on Jan. 17, 2019, provisional application No. 62/760,262, filed on Nov. 13, 2018.

(56) References Cited

U.S. PATENT DOCUMENTS

| | | | |
|---|---|---|---|
| 7,450,727 | B2 | 11/2008 | Griesinger |
| 8,712,059 | B2 | 4/2014 | Del Galdo |
| 9,349,118 | B2 | 5/2016 | Chavez |
| 9,357,323 | B2 | 5/2016 | Ramabadran |
| 9,510,127 | B2 | 11/2016 | Squires |
| 9,521,170 | B2 | 12/2016 | Bader-Natal |
| 9,728,181 | B2 | 8/2017 | Jot |
| 9,755,847 | B2 | 9/2017 | Clavel |
| 9,774,975 | B2 | 9/2017 | Krueger |
| 9,774,976 | B1 | 9/2017 | Baumgarte |
| 9,820,037 | B2 | 11/2017 | Jussi |
| 9,838,822 | B2 | 12/2017 | Boehm |
| 9,854,375 | B2 | 12/2017 | Stockhammer |
| 9,933,989 | B2 | 4/2018 | Tsingos |
| 9,955,278 | B2 | 4/2018 | Fersch |
| 9,986,363 | B2 | 5/2018 | Bošnjak et al. |
| 10,057,707 | B2 | 8/2018 | Cartwright |
| 10,062,208 | B2 | 8/2018 | Ziman |
| 10,068,577 | B2 | 9/2018 | Melkote |
| 10,187,739 | B2 | 1/2019 | Goodwin |
| 10,210,907 | B2 | 2/2019 | Puri |
| 10,290,304 | B2 | 5/2019 | Hirvonen |
| 11,699,451 | B2 | 7/2023 | McGrath |
| 11,765,536 | B2 | 9/2023 | Bruhn |
| 2004/0135040 | A1* | 7/2004 | Eason ............... F16M 11/048 |
| | | | 248/122.1 |
| 2005/0147261 | A1* | 7/2005 | Yeh ..................... H04R 3/12 |
| | | | 381/26 |
| 2006/0115100 | A1 | 6/2006 | Faller |
| 2009/0171676 | A1 | 7/2009 | Oh |
| 2009/0264114 | A1 | 10/2009 | Jussi |
| 2009/0299742 | A1 | 12/2009 | Toman |
| 2009/0325524 | A1 | 12/2009 | Oh |
| 2010/0008640 | A1 | 1/2010 | Casaccia |
| 2010/0061558 | A1* | 3/2010 | Faller ................... H04S 7/30 |
| | | | 381/23 |
| 2010/0188568 | A1* | 7/2010 | Abe .................. H04N 21/643 |
| | | | 348/E5.093 |
| 2010/0228554 | A1 | 9/2010 | Beack |
| 2010/0303265 | A1* | 12/2010 | Porwal ................. H04R 5/02 |
| | | | 348/42 |
| 2010/0332239 | A1 | 12/2010 | Kim |
| 2011/0208528 | A1 | 8/2011 | Schildbach |
| 2011/0222694 | A1 | 9/2011 | Del Galdo |
| 2012/0070007 | A1 | 3/2012 | Kim |
| 2012/0082319 | A1 | 4/2012 | Jot |
| 2012/0114126 | A1 | 5/2012 | Thiergart |
| 2012/0177204 | A1 | 7/2012 | Hellmuth |
| 2013/0322640 | A1 | 12/2013 | Dickins |
| 2014/0226838 | A1* | 8/2014 | Wingate ............ G10L 21/0272 |
| | | | 381/111 |
| 2014/0297296 | A1 | 10/2014 | Koppens |
| 2014/0350944 | A1 | 11/2014 | Jot |
| 2014/0358567 | A1* | 12/2014 | Koppens ............. H04S 7/308 |
| | | | 704/500 |
| 2014/0376728 | A1* | 12/2014 | Ramo ................. H04S 7/40 |
| | | | 381/56 |
| 2015/0035940 | A1 | 2/2015 | Shapiro |
| 2015/0142427 | A1 | 5/2015 | Terentiv |
| 2015/0162012 | A1 | 6/2015 | Kastner |
| 2015/0194158 | A1 | 7/2015 | Oh |
| 2015/0208156 | A1* | 7/2015 | Virolainen ............ H04R 1/406 |
| | | | 381/92 |
| 2015/0269951 | A1 | 9/2015 | Kalker |
| 2015/0332663 | A1 | 11/2015 | Jot |
| 2015/0356978 | A1 | 12/2015 | Dickins |
| 2016/0035355 | A1 | 2/2016 | Thesing |
| 2016/0080880 | A1 | 3/2016 | Goshen |
| 2016/0111099 | A1 | 4/2016 | Hirvonen |
| 2016/0150343 | A1 | 5/2016 | Wang |
| 2016/0167672 | A1* | 6/2016 | Krueger ................ G16H 40/63 |
| | | | 340/576 |
| 2016/0180826 | A1 | 6/2016 | Dickins |
| 2016/0240204 | A1 | 8/2016 | Kuech |
| 2016/0255454 | A1 | 9/2016 | McGrath |
| 2016/0345092 | A1 | 11/2016 | Jussi |
| 2017/0026650 | A1* | 1/2017 | Mittal ................. H04N 19/172 |
| 2017/0098452 | A1 | 4/2017 | Tracey |
| 2017/0156015 | A1 | 6/2017 | Stockhammer |
| 2017/0171576 | A1 | 6/2017 | Oh |
| 2017/0215019 | A1 | 7/2017 | Chen |
| 2017/0245055 | A1 | 8/2017 | Sun |
| 2017/0263259 | A1* | 9/2017 | Tsukagoshi .......... G10L 19/167 |
| 2017/0270711 | A1* | 9/2017 | Schoenberg .......... A63F 13/213 |
| 2017/0318070 | A1 | 11/2017 | Zaitsev |
| 2017/0353812 | A1 | 12/2017 | Schaefer |
| 2018/0047394 | A1* | 2/2018 | Tian ..................... G10L 15/24 |
| 2018/0077491 | A1* | 3/2018 | Butler .................. G10L 19/008 |
| 2018/0090151 | A1 | 3/2018 | Dick |
| 2018/0098174 | A1 | 4/2018 | Goodwin |
| 2018/0123813 | A1 | 5/2018 | Milevski |
| 2018/0139413 | A1 | 5/2018 | Diao |
| 2018/0192189 | A1 | 7/2018 | Kalevi |
| 2018/0240470 | A1 | 8/2018 | Wang |
| 2018/0332421 | A1 | 11/2018 | Torres |
| 2018/0338213 | A1* | 11/2018 | Lehtiniemi ............ H04S 7/303 |
| 2018/0375676 | A1 | 12/2018 | Bader-Natal |
| 2019/0007783 | A1 | 1/2019 | Magariyachi |
| 2019/0013028 | A1 | 1/2019 | Atti |
| 2019/0026936 | A1 | 1/2019 | Gorur Sheshagiri |
| 2019/0103118 | A1 | 4/2019 | Atti |
| 2019/0132674 | A1 | 5/2019 | Mlkamo |
| 2019/0296821 | A1* | 9/2019 | Choi .................... H04B 7/0617 |
| 2021/0050022 | A1 | 2/2021 | Kjoerling |
| 2022/0022000 | A1 | 1/2022 | Bruhn |
| 2023/0209302 | A1 | 6/2023 | Koppens |

FOREIGN PATENT DOCUMENTS

| | | |
|---|---|---|
| JP | 2005181391 A | 7/2005 |
| JP | 2009081861 A | 4/2009 |
| JP | 2009532735 A | 9/2009 |
| JP | 2011193164 A | 9/2011 |
| JP | 2012503792 A | 2/2012 |
| JP | 2012141633 A | 7/2012 |
| JP | 2013210501 A | 10/2013 |
| JP | 2015-529850 | 10/2015 |
| JP | 2015-531078 | 10/2015 |
| JP | 2015528926 A | 10/2015 |
| JP | 2016519788 A | 7/2016 |
| JP | 2016-525715 | 8/2016 |
| JP | 2016-530788 | 9/2016 |
| JP | 2016528542 A | 9/2016 |
| JP | 2017-515164 | 6/2017 |
| JP | 2018511070 A | 4/2018 |
| KR | 20150032734 | 3/2015 |
| MX | 06009931 A | 3/2007 |
| WO | 2005094125 A1 | 10/2005 |
| WO | 2016142375 | 3/2015 |
| WO | 2016209098 A1 | 12/2016 |
| WO | 2017023601 A1 | 2/2017 |
| WO | 2017140666 | 8/2017 |
| WO | 2017182714 | 10/2017 |
| WO | WO-2017182714 A1 * | 10/2017 ........... G10L 19/008 |
| WO | 2018060550 | 4/2018 |
| WO | 2018091776 | 5/2018 |

(56) References Cited

FOREIGN PATENT DOCUMENTS

| WO | 2018100232 | A1 | 6/2018 |
|----|------------|----|--------|
| WO | 2018106735 | A1 | 6/2018 |
| WO | 2018226508 |    | 12/2018 |
| WO | 2019068638 |    | 4/2019 |
| WO | 2019091575 |    | 5/2019 |
| WO | 2019097017 |    | 5/2019 |
| WO | 2019105575 |    | 6/2019 |
| WO | 2019106221 |    | 6/2019 |
| WO | 2019129350 |    | 7/2019 |

OTHER PUBLICATIONS

Tdoc S4 (18)0087 "On IVAS audio formats for mobile capture devices" Source: Nokia Corporation, Feb. 5-9, 2018, Fukuoka, Japan.
Tdoc S4-171221 "IVAS use case of spatial conferencing and related codec requirements" Nov. 13-17, 2017, Albuquerque, NM, USA.
Tdoc S4-180143, "Use case specific IVAS design constraints" source: Dolby Laboratories, Inc. Feb. 5-9, 2018 meeting, Fukuoka, Japan.
Tdoc S4-180466, "On capture formats for IVAS" Source: Qualcomm Incorporated, Apr. 9-13, 2018, Kista, Sweden.
Tdoc S4-180806 "Dolby VRStream audio profile candidate—Description of Bitstream, Decoder, and Renderer plus informative Encoder Description" Source: Dolby Laboratories, Inc. Jul. 9-13, 2018, Rome, Italy.
Tdoc S4-191307 IVAS Design Constraints (IVAS-4), TSG SA4#106 meeting, Oct. 21-25, 2019, Busan, Korea.
Gabin, F. et al."5G Multimedia Standardization" Journal of ICT Standardization vol. 6 Issue: Combined Special Issue 1 & 2 Published In: May 2018.
McGrath, D. et al."Immersive Audio Coding for Virtual Reality Using a Metadata-assisted Extension of the 3GPP EVS Codec" ICASSP IEEE International Conference on Acoustics, Speech and Signal Processing, May 2019.
TDOC S4 "Proposal for IVAS MASA Channel Audio Format Parameter" Apr. 8-12, 2019, Newport Beach, CA, USA.
Williams, D., Pooransingh, A., & Saitoo, J. (2017). Efficient music identification using ORB descriptors of the spectrogram image. EURASIP Journal on Audio, Speech, and Music Processing, 2017(1). doi:10.1186/s13636-017-0114-4.
ETSI TS 103 190-2 "Digital Audio Compression (AC-4) Standard Part 2: Immersive and Personalized Audio" 103 190-2 V1.3.1 (2017-10).
ETSI TS 103 420 V1.1.1, Jul. 2016 "Backwards-Compatible Object Audio Carriage Using Enhanced AC-3".
Sen, D. et al."Efficient Compression and Transportation of Scene-Based Audio for Television Broadcast" Jul. 14, 2016, AES International Conference, pp. 1-8.
Setiawan, P. et al."Compressing Higher Order Ambisonics of a Multizone Soundfield" published in Acoustics, Speech and Signal Processing Mar. 2017.
Sound Labs, "3D Audio Formats for Virtual Reality" Jun. 29, 2016.
Villemoes, L. et al."Decorrelation for Audio Object Coding" IEEE published in Acoustics, Speech and Signal Processing, Mar. 2017, pp. 706-709.

* cited by examiner

AUDIO PROCESSING IN IMMERSIVE AUDIO SERVICES

CROSS-REFERENCE TO RELATED APPLICATIONS

This application is a U.S. National Stage Application under U.C.S. 371 of International Application No. PCT/US2019/060855, filed on Nov. 12, 2019, which in turn, claims the benefit of priority from U.S. Provisional Patent Application Nos. 62/760,262 filed 13 Nov. 2018; 62/793,666 filed 17 Jan. 2019, 62/795,236 filed 22 Jan. 2019; and 62/797,563 filed 28 Jan. 2019 which are hereby incorporated by reference in their entirety.

TECHNICAL FIELD

The disclosure herein generally relates to capturing, acoustic pre-processing, encoding, decoding, and rendering of directional audio of an audio scene. In particular, it relates to a device adapted to modify a directional property of a captured directional audio in response to spatial data of a microphone system capturing the directional audio. The disclosure further relates to a rendering device configured to modify a directional property of a received directional audio in response to received spatial data.

BACKGROUND

The introduction of 4G/5G high-speed wireless access to telecommunications networks, combined with the availability of increasingly powerful hardware platforms, have provided a foundation for advanced communications and multimedia services to be deployed more quickly and easily than ever before.

The Third Generation Partnership Project (3GPP) Enhanced Voice Services (EVS) codec has delivered a highly significant improvement in user experience with the introduction of super-wideband (SWB) and full-band (FB) speech and audio coding, together with improved packet loss resiliency. However, extended audio bandwidth is just one of the dimensions required for a truly immersive experience. Support beyond the mono and multi-mono currently offered by EVS is ideally required to immerse the user in a convincing virtual world in a resource-efficient manner.

In addition, the currently specified audio codecs in 3GPP provide suitable quality and compression for stereo content but lack the conversational features (e.g. sufficiently low latency) needed for conversational voice and teleconferencing. These coders also lack multi-channel functionality that is necessary for immersive services, such as live and user-generated content streaming, virtual reality (VR) and immersive teleconferencing.

The development of an extension to the EVS codec has been proposed for Immersive Voice and Audio Services (IVAS) to fill this technology gap and to address the increasing demand for rich multimedia services. In addition, teleconferencing applications over 4G/5G will benefit from an IVAS codec used as an improved conversational coder supporting multi-stream coding (e.g. channel, object, and scene-based audio). Use cases for this next generation codec include, but are not limited to, conversational voice, multi-stream teleconferencing, VR conversational and user generated live and non-live content streaming.

IVAS is thus expected to offer immersive and VR, AR and/or XR user experiences. In many of these applications, a device (e.g. a mobile phone) capturing directional (immersive) audio may in many cases be moving during the session relative to the acoustical scene, causing a spatial rotation and/or translational movement of the captured audio scene. Depending on the kind of provided experience, e.g. immersive, VR, AR or XR and depending on the specific use case, this behaviour may be desired or undesired. For example, it may be disturbing for a listener if the rendered scene always rotates whenever the capturing device rotates. In the worst case, motion sickness may be caused.

There is thus a need for improvements within this context.

BRIEF DESCRIPTION OF DRAWINGS

Example embodiments will now be described with reference to the accompanying drawings, on which.

All the figures are schematic and generally only show parts which are necessary in order to elucidate the disclosure, whereas other parts may be omitted or merely suggested. Unless otherwise indicated, like reference numerals refer to like parts in different figures.

DETAILED DESCRIPTION

Figure 1:
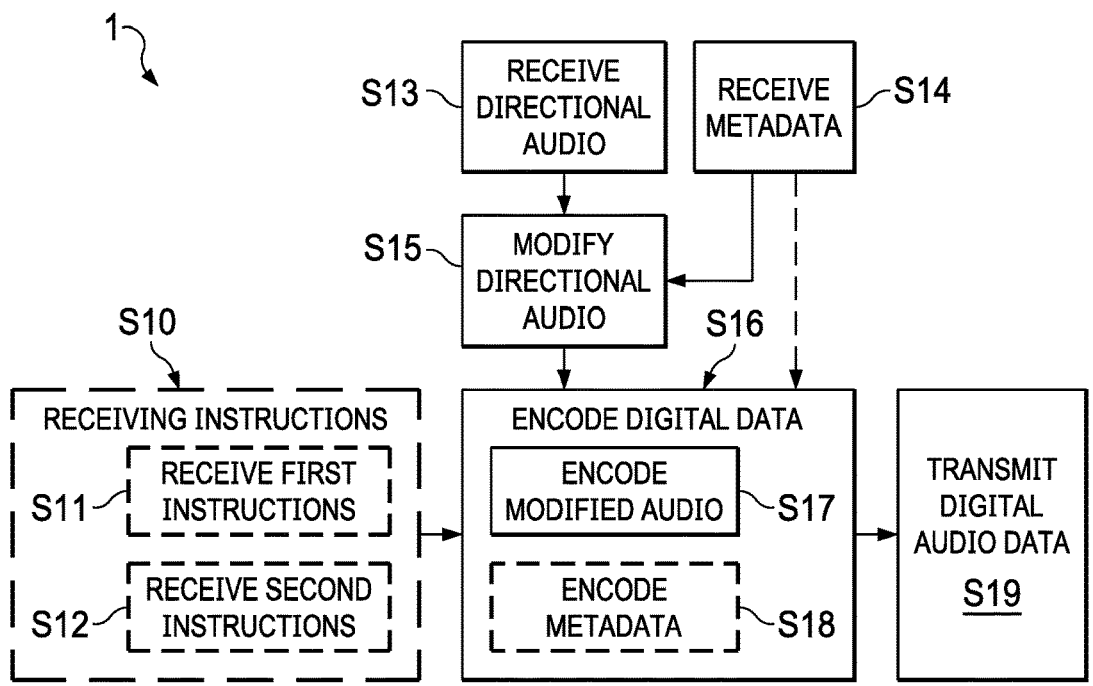
FIG. 1 shows a method for encoding directional audio according to embodiments.

In view of the above it is thus an object to provide devices and associated methods for capturing, acoustic pre-processing, and/or encoding to compensate for undesired movements of the spatial sound scene that may result from inadvertent movements of a microphone system capturing directional audio. It is further an object to provide a corresponding decoder and/or rendering device and associated methods for decoding and rendering directional audio. Systems comprising e.g. the encoder device and the rendering device is also provided.

I. Overview—Sending Side

According to a first aspect, there is provided a device comprising or connected to a microphone system comprising one or more microphones for capturing audio. The device (also referred to herein as a sending side, or capturing device) comprises a receiving unit configured to:
receive directional audio captured by the microphone system;
receive metadata associated with the microphone system, the metadata comprising spatial data of the microphone system, the spatial data being indicative of a spatial orientation and/or spatial position of the microphone system and comprising at least one from the list of: an azimuth, pitch, roll angle(s), and spatial coordinates of the microphone system.

In this disclosure, the term "directional audio" (directional sound) generally refers to immersive audio, i.e. audio captured by directional microphone systems which can pick up sounds including directions from which they arrive. The playback of directional audio allows for a natural three-dimensional sound experience (binaural rendering). The audio, which may comprise audio objects, and/or channels (e.g. representing scene-based audio in Ambisonics B-format or channel-based audio), is thus associated with directions from which it is received. In other words, the directional audio stem from the directional sources, and is incident from a direction of arrival (DOA) represented by e.g. azimuth and elevation angles. In contrast, diffuse ambient sound is assumed to be omnidirectional, i.e., spatially invariant, or spatially uniform. Other expressions that may be used for the feature of "directional audio" includes "spatial audio", "spatial sound", "immersive audio", "immersive sound", "stereo" and "surround audio".

In this disclosure, the term "spatial coordinates" generally refers to the spatial position of the microphone system or the capture device in space. Cartesian coordinates are one realization of spatial coordinates. Other examples include cylindrical or spherical coordinates. It should be noted that the position in space may be relative (e.g. coordinates in a room, or relative to another device/unit, etc.) or absolute (e.g. GPS coordinates or similar).

In this disclosure, the "spatial data" generally indicates either a current rotational orientation and/or spatial position of the microphone system or a change in rotational orientation and/or spatial position in comparison with a previous orientation/position of the microphone system.

The device thus receives metadata comprising spatial data indicative of a spatial orientation and/or spatial position of the microphone system capturing the directional audio.

The device further comprises a computing unit configured to: modify at least some of the directional audio to produce modified directional audio, whereby a directional property of the audio is modified in response to the spatial orientation and/or spatial position of the microphone system.

The modification may be done using any suitable means, for example by defining a rotation/translation matrix based on the spatial data, and multiply the directional audio with this matrix to achieve the modified directional audio. Matrix multiplication is suitable for non-parametric spatial audio. Parametric spatial audio may be modified by adjusting the spatial metadata, like e.g. the directional parameters of the sound object(s).

The modified directional audio is then encoded into digital audio data, which data is transmitted by a transmitting unit of the device.

The inventors have realized that rotational/translational movements of the sound capturing device (microphone system) are best compensated at the sending end, i.e. at the end capturing the audio. This may likely allow the best possible stabilization of the captured audio scene with regards to e.g. unintended movements. Such compensation may be part of the capture process, i.e. during the acoustic pre-processing, or as part of the IVAS encoding stage. Moreover, by performing the compensation at the sending end, the need of transmitting the spatial data from the sending end to the receiving end is relaxed. In case the compensation for rotational/translational movements of the sound capturing device was to be performed at the receiver of the audio, the full spatial data had to be transmitted to the receiving end. Assuming that rotational coordinates in all three axes are represented with 8 bits each and estimated and conveyed at a rate of 50 Hz, the resulting bit rate would be 1.2 kbps. The analogue assumption can be made for spatial coordinates of the microphone system.

According to some embodiments, the spatial orientation of the microphone system is represented with parameters describing rotational movement/orientation with one degree of freedom, DoF, in the spatial data. For example, it may be sufficient to only consider the azimuth angle for telephone conferencing.

According to some embodiments, the spatial orientation of the microphone system is represented with parameters describing rotational orientation/movement with three degrees of freedom, DoF, in the spatial data.

According to some embodiments, the spatial data of the microphone system is represented in six DoF. In this embodiment, the spatial data of the microphone system captures a changed position (herein referred to as spatial coordinates) of the microphone system as forward/backward (surge), up/down (heave), left/right (sway) translation in three perpendicular axes, combined with changes in orientation (or present rotational orientation) of the microphone system through rotation about three perpendicular axes, often termed yaw or azimuth (normal/vertical axis), pitch (transverse axis), and roll (longitudinal axis).

According to some embodiments, the received directional audio comprises audio comprising directional metadata. For example, such audio may comprise audio objects, i.e. object-based audio (OBA). OBA is a parametric form of spatial/directional audio with spatial metadata. A particular form of parametric spatial audio is metadata-assisted spatial audio (MASA).

According to some embodiments, the computing unit is further configured to encode at least parts of the metadata comprising spatial data of the microphone system into said digital audio data. Advantageously, this allows for compensation of the directional adjustment made to the captured audio at the receiving end. Subject to definition of a suitable rotation reference frame, e.g. with the z-axis corresponding to the vertical direction, in many cases merely the azimuth angle may have to be transmitted (at e.g. 400 bps). Pitch and roll angles of the capture device in the rotation reference frame may only be required in certain VR applications. By compensation for the spatial data of the microphone system at the sending side, and conditionally including at least parts of the spatial data in the encoded digital audio data, the case where the rendered acoustical scene should be invariant of the capture device position and the remaining cases where the rendered acoustical scene should rotate with corresponding movements of the capture device are advantageously supported.

According to some embodiments, the receiving unit is further configured to receive first instructions indicating to the computing unit whether to include said at least parts of the metadata comprising spatial data of the microphone system into said digital audio data, whereby the computing unit acts accordingly. Consequently, the sending side conditionally includes parts of the spatial data in the digital audio data, to save bitrate when possible. The instruction may be received more than once during a session such that whether the (parts of the) spatial data should be included or not in the digital audio data changes over time. In other words, there may be in-session adaptations where the first instructions can be received by the device both in a continuous and discontinuous way. Continuous would, e.g. be once every frame. Discontinuous could be only once a new instruction should be given. There is also the possibility to receive the first instruction only once in a session setup.

According to some embodiments, the receiving unit is further configured to receive second instructions indicating to the computing unit which parameter or parameters of the spatial data of the microphone system to include in the digital audio data, whereby the computing unit acts accordingly. As exemplified above, the sending side may be instructed to only include the azimuth, or to include all data defining the spatial orientation of the microphone system. The instruction may be received more than once during a session such that the number of parameters included in the digital audio data changes over time. In other words, there may be in-session adaptations where the second instructions can be received by the device both in a continuous and discontinuous way. Continuous would, e.g. be once every frame. Discontinuous could be only once a new instruction should be given. There is also the possibility to receive the second instruction only once in a session setup.

According to some embodiments, the transmitting unit is configured to transmit the digital audio data to a further device, wherein indications about the first and/or second instructions are received from said further device. In other words, the receiving side (comprising a renderer for rendering the received decoded audio) may, depending on context, instruct the sending side whether to include part of the spatial data or not in the digital audio data, and/or which parameters to include. In other embodiments, indications about the first and/or second instructions may be received from e.g. a coordinating unit (call server) for a multi-user immersive audio/video conference, or any other unit not directly involved in the rendering of the directional audio.

According to some embodiments, the receiving unit is further configured to receive metadata comprising a time stamp indicating a capturing time of the directional audio, wherein the computing unit is configured to encode said time stamp into said digital audio data. Advantageously, this time stamp may be used for synchronizing at a receiving side, e.g. synchronizing the audio render with video render, or synchronising a plurality of digital audio data received from different capturing devices.

According to some embodiments, the encoding of the modified audio signals comprises downmixing the modified directional audio, wherein the downmixing is performed by taking into account the spatial orientation of the microphone system, and encoding the downmix and a downmix matrix used in the downmixing into said digital audio data. For example, acoustic beamforming towards a specific directional source of the directional audio is advantageously adapted based on the directional modification made to the directional audio.

According to some embodiments, the device is implemented in a virtual reality, VR, gear or augmented reality, AR, gear comprising the microphone system and a head-tracking device configured to determine spatial data of the device in 3-6 DoF. In other embodiments, the device is implemented in a mobile phone comprising a microphone system.

II. Overview—Receiving Side

According to a second aspect, there is provided a device for rendering audio signals. The device (also referred to herein as a receiving side, or rendering device) comprises a receiving unit configured to receive digital audio data. The device further comprises a decoding unit configured to decode the received digital audio data into directional audio and into metadata, the metadata comprising spatial data comprising at least one from the list of: an azimuth, pitch, roll angle(s) and spatial coordinates. The spatial data may for example be received in form of parameters, e.g. the 3 DoF angles. In other embodiments, the spatial data may be received as a rotation/translation matrix.

The device further comprises a rendering unit configured to:
  modifying a directional property of the directional audio using the rotational spatial data; and
  render the modified directional audio.

Advantageously, the device according to this aspect may modify the directional audio as indicated in the metadata. For example, movements of a device capturing the audio may be considered while rendering.

According to some embodiments, the spatial data indicates the spatial orientation and/or spatial position of a microphone system comprising one or more microphones capturing the directional audio, wherein the rendering unit modifies the directional property of the directional audio to at least partly reproduce an audio environment of the microphone system. In this embodiment, the device applies acoustic scene rotation by re-applying at least parts of the (relative, i.e. scene rotation being relative to the moving microphone system) acoustic scene rotation that was compensated at the capturing device.

According to some embodiments, the spatial data comprises parameters describing rotational movement/orientation with one degree of freedom, DoF.

According to some embodiments, the spatial data comprises parameters describing rotational movement/orientation with three degrees of freedom, DoF.

According to some embodiments, the decoded directional audio comprises audio comprising directional metadata. For example, the decoded directional audio may comprise audio objects, i.e. object-based audio (OBA). The decoded directional audio may in other embodiments be channel based, e.g. representing scene-based audio in Ambisonics B-format or channel-based audio.

According to some embodiments, the device comprises a transmitting unit configured to transmit instructions to a further device from which the digital audio is received, the instructions indicating to the further device which (if any) parameter or parameters the rotational data should comprise. Consequently, the rendering device may instruct the capturing device to transmit e.g. only rotational parameters, only the azimuth parameter, or full 6 DoF parameters, depending on the use case and/or the available bandwidth. Moreover, the rendering device may make this decision based on available computational resources at the renderer for applying acoustic scene rotation, or the level of complexity of the rendering unit. The instructions may be transmitted more than once during a session and thus changing over time, i.e. based on the above. In other words, there may be in-session adaptations where the device can transmit the instructions both in a continuous and discontinuous way. Continuous would, e.g. be once every frame. Discontinuous could be only once a new instruction should be given. There is also the possibility to transmit the instruction only once in a session setup.

According to some embodiments, the decoding unit is further configured to extract a time stamp indicating a capturing time of the directional audio from the digital audio data. This time stamp may be used for synchronizing reasons as discussed above.

According to some embodiments, the decoding of the received digital audio data into directional audio by the decoding unit comprises:
  decoding of the received digital audio data into downmixed audio, upmixing, by the decoding unit, the downmixed audio into the directional audio using a downmix matrix included in the received digital audio data.

According to some embodiments, the spatial data includes spatial coordinates and wherein the rendering unit is further configured to adjust a volume of the rendered audio based on the spatial coordinates. In this embodiment, the volume of audio received from "far away" may be attenuated compared to audio received from a closer location. It should be noted that the relatively closeness of the received audio may be determined based on a virtual space, where the position of the capturing device in this space in relation to the receiving device is determined based on the spatial coordinates of the devices, applying a suitable distance metric, e.g. Euclidean metric. A further step may involve using some arbitrary mapping scheme to determine from the distance metric audio render parameters such as a sound level. Advantageously, in this embodiment, the immersive experience of the rendered audio may be improved.

According to some embodiments, the device is implemented in a virtual reality, VR, gear or augmented reality, AR, gear comprising a head-tracking device configured to measure spatial orientation and spatial position of the device in six DoF. In this embodiment, also the spatial data of the rendering device may be used when modifying a directional property of the directional audio. For example, the received rotation/translation matrix may be multiplied with a similar matrix defining e.g. the rotational status of the rendering device, and the resulting matrix may then be used for modifying the directional property of the directional audio. Advantageously, in this embodiment, the immersive experience of the rendered audio may be improved. In other embodiments, the device is implemented in a telephone conferencing device or similar, which is assumed to be stationary, and wherein any rotational status of the device is disregarded.

According to some embodiments, the rendering unit is configured for binaural audio rendering.

III. Overview—System

According to a third aspect, there is provided a system comprising:
a first device according to the first aspect configured to transmit digital audio data to a second device according to the second aspect, wherein the system is configured for audio and/or video conferencing.

According to some embodiments, the first device further comprises a video recording unit and being configured to encode recorded video into digital video data and transmit the digital video data to the second device, wherein the second device further comprises a display for displaying decoded digital video data.

According to a fourth aspect, there is provided a system comprising: a first device according to the first aspect configured to transmit digital audio data to a second device the second device comprising:
a receiving unit configured to receive digital audio data,
a decoding unit configured to:
decode the received digital audio data into directional audio and into metadata, the metadata comprising spatial data comprising at least one from the list of: an azimuth, pitch, roll angle(s) and spatial coordinates;
a rendering unit for rendering audio;
wherein the rendering unit is configured to, upon the second device further receiving encoded video data from the first device: modify a directional property of the directional audio using the spatial data, and
render the modified directional audio;
wherein the rendering unit is configured to, upon the second device not receiving encoded video data from the first device:
render the directional audio.

Advantageously, the decision whether to reproduce an audio environment of the microphone system by compensating for the spatial orientation and/or spatial position of microphone system is made based on if video is transmitted or not. In this embodiment, the sending device may not always be aware when compensation of its movement is necessary or desirable. Consider for instance the situation when audio is rendered along with video. In that case, at least when the video capture is done with the same device that captures the audio, it may advantageously be possible to either rotate the audio scene along with the moving visual scene or to keep the audio scene stable. Keeping the audio scene stable by compensating capture device movements may be the preferred choice if video is not consumed.

According to a fifth aspect, there is provided a non-transitory computer-readable medium storing instructions that, when executed by one or more processors, cause the one or more processors to perform operations of any of aspects one to four.

IV. Overview—Generally

The second to fifth aspect may generally have the same or corresponding features and advantages as the first aspect.

Other objectives, features and advantages of the present invention will appear from the following detailed disclosure, from the attached dependent claims as well as from the drawings.

The steps of any method, or a device implementing a series of steps, disclosed herein do not have to be performed in the exact order disclosed, unless explicitly stated.

V—Example Embodiments

Immersive Voice and Audio Services are expected to offer immersive and Virtual Reality (VR) user experiences. Augmented Reality (AR) and Extended Reality (XR) experiences may also be offered. This disclosure deals with the fact that mobile devices like handheld UEs that capture an immersive or an AR/VR/XR scene may in many cases be moving during the session relative to the acoustical scene. It highlights cases where it should be avoided that rotational movements of the capturing device are reproduced as corresponding rendered scene rotation by the receiving device. This disclosure relates to how the above may be efficiently handled to meet requirements that the user has on immersive audio depending on the context.

It should be noted that, while some examples herein will be described in the context of an IVAS encoder, decoder, and/or renderer, it should be noted that this is merely one type of encoder/decoder/renderer in which the general principles of the invention can be applied, and that there may be many other types of encoders, decoders, and renderers that may be used in conjunction with the various embodiments described herein.

It should also be noted that while the terms "upmixing" and "downmixing" are used throughout this document, they may not necessarily imply increasing and reducing, respectively, the number of channels. While this may often be the case, it should be realized that either term can refer to either reducing or increasing the number of channels. Thus, both terms fall under the more general concept of "mixing."

Figure 3:
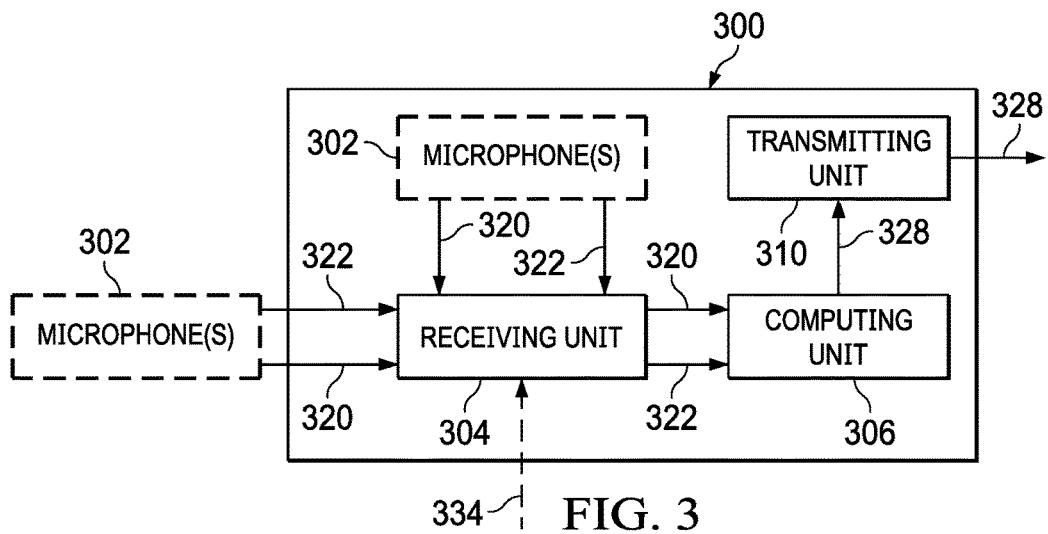
FIG. 3 shows an encoder device configured to perform the method of FIG. 1 according to embodiments.

Turning now to FIG. 1, a method 1 is described for encoding and transmitting a representation of directional audio, in accordance with one embodiment. A device 300 configured to perform the method 1 is shown in FIG. 3.

The device 300 may generally be a mobile phone (smartphone), however, the device may also be part of a VR/AR/XR equipment or any other type of device comprising or connected to a microphone system 302 comprising one or more microphones for capturing direction audio. The device 300 may thus comprise the microphone system 302 or be connected (wired or wireless) to a remotely located microphone system 302. In some embodiments, the device 300 is implemented in a VR gear or AR gear comprising the microphone system 302 and a head-tracking device configured to determine spatial data of the device in 1-6 DoF.

In some audio capturing scenarios, a position and/or the spatial orientation of the microphone system 302 may be changing during the capturing of the directional audio.

Two exemplary scenarios will now be described.

A change of a position and/or the spatial orientation of the microphone system 302 during audio capturing may cause spatial rotation/translation of the rendered scene at a receiving device. Depending on the kind of provided experience, e.g. immersive, VR, AR or XR and depending on the specific use case, this behaviour may be desired or undesired. One example where this may be desired is when the service additionally provides a visual component and where the capturing camera (e.g. 360 degrees video capture, not shown in FIG. 1) and the microphones 302 are integrated in the same device. In that case, it should be expected that a rotation of the capture device should result in a corresponding rotation of the rendered audio-visual scene.

On the other hand, if the audio-visual capture is not done by the same physical device or in case there is no video component, it may be disturbing for a listener if the rendered scene rotates whenever the capturing device rotates. In the worst case, motion sickness may be caused. It is thus desirable to compensate for positional changes (translation and/or rotations) of the capture device. Examples include immersive telephony and immersive conferencing applications using a smartphone as a capturing device (i.e. comprising the set of microphones 302. In these use cases, it may frequently happen that the set of microphones is moved inadvertently either because it is handheld or because the user touches it during operation. The user of the capturing device may be unaware that moving it may cause instabilities of the rendered spatial audio at the receiving devices. It can generally not be expected from the user to hold the phone still while in a conversation situation.

The methods and device described hereinafter are defined to some or all of the above described scenarios.

The device 300 thus comprises or is connected to a microphone system 302 comprising one or more microphones for capturing audio. The microphone system may thus comprise 1, 2, 3, 5, 10, etc., microphones. In some embodiments, the microphone system comprises a plurality of microphones. The device 300 comprises a plurality of functional units. The units may be implemented in hardware and/or software and may comprise one or more processors for handling the functionality of the units.

The device 300 comprises a receiving unit 304 which is configured to receive S13 directional audio 320 captured by the microphone system 302. The directional audio 320 is preferably an audio representation that readily allows audio scene rotation and/or translation. The directional audio 320 may for example comprise audio objects and/or channels which allows for audio scene rotation and/or translation. The directional audio may comprise channel-based audio (CBA) such as stereo, multi-channel/surround, 5.1, 7.1, etc.,
scene-based audio, (SBA) such as first-order and higher-order Ambisonics.
object-based audio (OBA).

CBA and SBA are non-parametric forms of spatial/directional audio, whereas OBA is parametric with spatial metadata. A particular form of parametric spatial audio is metadata-assisted spatial audio (MASA).

The receiving unit 304 is further configured to receive S14 metadata 322 associated with the microphone system 302. The metadata 322 comprises spatial data of the microphone system 302. The spatial data is indicative of a spatial orientation and/or spatial position of the microphone system 302. The spatial data of the microphone system comprises at least one from the list of: an azimuth, pitch, roll angle(s), and spatial coordinates of the microphone system. The spatial data may be represented in 1 degrees of freedom, DoF (e.g. only the azimuth angle of the microphone system), three DoF (e.g. the spatial orientation of the microphone system in 3 DoF), or in six DoF (both spatial orientation in 3 DoF and spatial position in 3 DoF). The spatial data may of course be represented in any DoF from one to six.

The device 300 further comprises a computing unit 306 which receives the directional audio 320 and the metadata 322 from the receiving unit 304 and modify S15 at least some of the directional audio 320 (e.g. at least some of the audio objects of the directional audio) to produce modified directional audio. This modification results in that a directional property of the audio is modified in response to the spatial orientation and/or spatial position of the microphone system.

The computing unit 306 is then encoding S16 digital data by encoding S17 the modified directional audio into digital audio data 328. The device 300 further comprises a transmitting unit 310 configured to transmit (wired or wireless) the digital audio data 328, e.g. as a bitstream.

By compensating for rotational and/or translational movements of the microphone system 302 already at the encoding device 300 (may also be referred to a sending device, capturing device, transmitting device, sending side), the requirements for transmitting the spatial data of the microphone system 302 is relaxed. If such compensation were to be done by a device receiving the encoded directional audio (e.g. an immersive audio renderer), all required metadata would always need to be included in the digital audio data 328. Assuming that rotational coordinates of the microphone system 302 in all three axes are represented with 8 bits each and estimated and conveyed at a rate of 50 Hz, the resulting increase in bit rate of the signal 332 would be 1.2 kbps. Furthermore, it is likely that the variations of the auditory scene in case there is no motion compensation at the capture side may make the spatial audio coding more demanding and potentially less efficient.

Moreover, as the information underlying the modifying decision is readily available at the device 300, it is appropriate to compensate for rotational/translational movements of the microphone system 302 already here, which thus can be done efficiently. The maximum algorithmic delay for this operation may thus be reduced.

Yet another advantage is that by always (instead of conditionally, upon request) compensating for rotational/translational movements at the capturing device 300 and conditionally providing the receiving ends with spatial orientation data of the capture system, potential conflicts if multiple endpoints with different rendering needs are served, such as in multi-party conferencing use cases, are avoided.

The above cover all cases where the rendered acoustical scene should be invariant of the position and rotation of the microphone system 302 capturing the directional audio. To address the remaining cases where the rendered acoustical scene should rotate with corresponding movements of the microphone system 302, the computing unit 306 may optionally be configured to encode S18 at least parts of the metadata 322 comprising spatial data of the microphone system into said digital audio data 328. For example, subject to definition of a suitable rotation reference frame, e.g. with the z-axis corresponding to the vertical direction, in many cases merely the azimuth angle may have to be transmitted (at e.g. 400 bps). Pitch and roll angles of the microphone system 302 in the rotation reference frame may only be required in certain VR applications.

The conditionally provided rotational/translational parameters may typically be transmitted as one conditional element of the IVAS RTP payload format. These parameters will thus require a small portion of the allocated bandwidth.

To meet the different scenarios, the receiving unit 304 may optionally be configured to receive S10 instructions of how to handle the metadata 322 when the computing unit 306 is encoding the digital audio data 328. The instructions may be received S10 from a rendering device (e.g. another part in the audio conference) or from a coordinating device such as a call server or similar.

In some embodiments, the receiving unit 304 is further configured to receive S11 first instructions indicating to the computing unit 306 whether to include said at least parts of the metadata 322 comprising spatial data of the microphone system into said digital audio data. In other words, the first instructions inform the device 300 if any or none of the metadata should be included in the digital audio data 328. For example, if the device 300 is transmitting the digital audio data 328 as a part of an audio conference, the first instructions may define that no part of the metadata 322 should be included.

Alternatively, or additionally, in some embodiments, the receiving unit 304 is further configured to receive second instructions indicating to the computing unit which parameter or parameters of the spatial data of the microphone system to include in the digital audio data, whereby the computing unit acts accordingly. For example, for bandwidth reasons or other reasons, the second instructions may define to the computing unit 306 to only include the azimuth angle in the digital audio data 328.

The first and/or second instructions may typically be subject to session setup negotiation. Thus, none of these instructions require transmissions during the session and will not require any of the allocated bandwidth for e.g. the immersive audio/video conference.

As mentioned above, the device 300 may be part of a video conference. For this reason, the receiving unit 304 may further be configured to receive metadata (not shown in FIG. 1) comprising a time stamp indicating a capturing time of the directional audio, wherein the computing unit 306 is configured to encode said time stamp into said digital audio data. Advantageously the modified directional audio may then be synchronized with captured video on the rendering side.

In some embodiments, the encoding S17 of the modified directional audio comprises downmixing the modified directional audio, wherein the downmixing is performed by taking into account the spatial orientation of the microphone system 302 and encoding the downmix and a downmix matrix used in the downmixing into said digital audio data 328. The downmixing may for example comprise adjusting a beamforming operation of the directional audio 320 based on the spatial data of the microphone system 302.

The digital audio data is thus transmitted S19 from the device 300 as transmitting part of e.g. an immersive audio/video conference scenario. The digital audio data is then received by a device for rendering audio signals, e.g. a receiving part of the immersive audio/video conference scenario. The rendering device 400 will now be described in conjunction with FIGS. 2 and 4.

The device 400 rendering audio signals comprises a receiving unit 402 configured to receive S21 (wired or wireless) digital audio data 328.

The device 400 further comprises a decoding unit 404 configured to decode S22 the received digital audio data 328 into directional audio 420 and into metadata 422, the metadata 422 comprising spatial data comprising at least one from the list of: an azimuth, pitch, roll angle(s) and spatial coordinates.

In some embodiments, upmixing is performed by the decoding unit 404. In these embodiments, the decoding of the received digital audio data 328 into directional audio 420 by the decoding unit 404 comprises: decoding of the received digital audio data 328 into downmixed audio, and upmixing, by the decoding unit 404, the downmixed audio into the directional audio 420 using a downmix matrix included in the received digital audio data 328.

The device further comprises a rendering unit 406 configured to modifying S23 a directional property of the directional audio using the spatial data; and render S24 the modified directional audio 424 using speakers or headphones.

The device 400 (the rendering unit 406 thereof) is thus configured to apply acoustic scene rotation/translation based on received spatial data.

In some embodiments, the spatial data indicates the spatial orientation and/or spatial position of a microphone system comprising one or more microphones capturing the directional audio, wherein the rendering unit modifies S23 the directional property of the directional audio to at least partly reproduce an audio environment of the microphone system. In this embodiment, the device 400 re-applies at least parts of the acoustic scene rotation that was compensated at the capture end by the device 300 of FIG. 3.

The spatial data may comprise spatial data comprising rotational data representing motion in three degrees of freedom, DoF. Alternatively, or additionally, the spatial data may include spatial coordinates.

The decoded directional audio may in some embodiments comprise audio objects, or more generally, audio associated with spatial metadata as described above.

The decoding S22 of the received digital audio data into directional audio by the decoding unit 404 may in some embodiments comprise decoding of the received digital audio data into downmixed audio, and upmixing, by the decoding unit 404, the downmixed audio into the directional audio using a downmix matrix included in the received digital audio data 328.

To provide increased flexibility, and/or to meet bandwidth requirements, the device 400 may comprise a transmitting unit 306 configured to transmit S20 instructions to a further device from which the digital audio data 328 is received, the instructions indicating to the further device which (if any) parameter or parameters the rotational or translational data should comprise. This feature may thus facilitate meeting potential user preferences or preferences related to the rendering and/or the kind of used service.

In some embodiments, the device 400 may also be configured to transmit instructions indicating to the further device whether to include the metadata comprising spatial data into the digital audio data 328 or not. In these embodiments, if the received S21 digital audio data 328 does not comprise any such metadata, the rendering unit will render decoded directional audio as received (possibly upmixed as described above), without any modification of a directional property of the directional audio due to compensations made at the capturing device 300. However, in some embodiments, the received directional audio is modified in response to head-tracking information of the renderer (as further described below).

The device 400 may in some embodiments be implemented in a VR gear or AR gear comprising a head-tracking device configured to measure spatial orientation of the device in six DoF. The rendering unit 406 may be configured for binaural audio rendering.

In some embodiments, the rendering unit 406 is configured to adjust S25 a volume of the rendered audio based on the spatial coordinates received in the metadata. This feature will be further described below in conjunction with FIGS. 6-7

Figure 4:
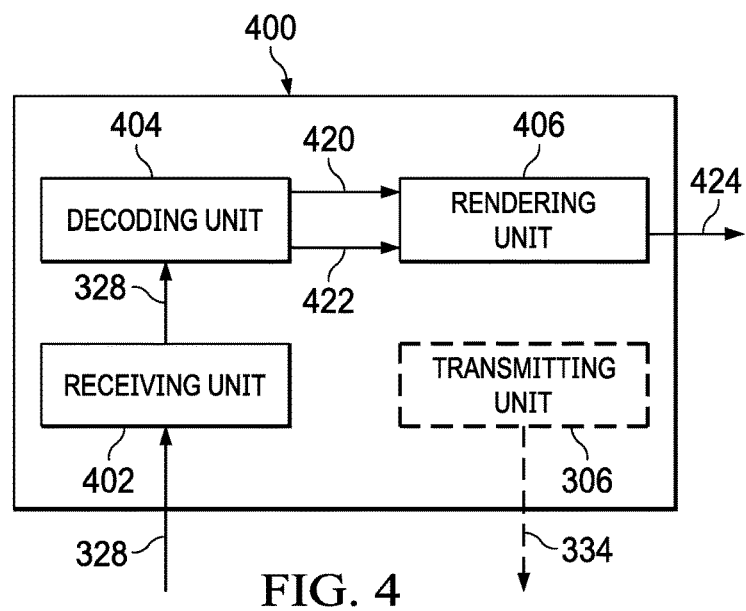
FIG. 4 shows a rendering device configured to perform the method of FIG. 2 according to embodiments.
Figure 5:
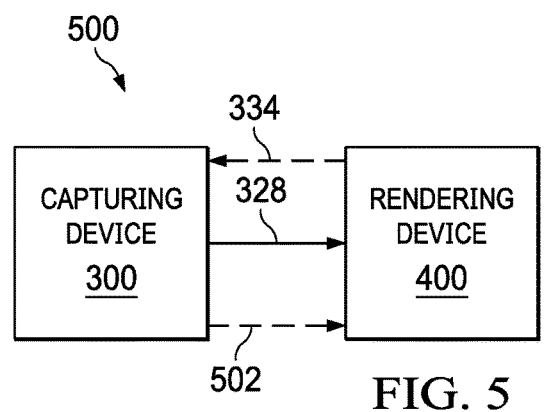
FIG. 5 shows a system comprising the devices of FIG. 3 and FIG. 4 according to embodiments.

FIG. 5 shows a system comprising a capturing device 300 (as described in conjunction with FIG. 3) and a rendering device 400 (as described in conjunction with FIG. 4). The capturing device 300 may in some embodiments receive S10 instructions 334 transmitted S20 from the rendering device 400 indicating if and to what extent the capturing device 300 should include spatial data of the microphone system of the capturing device in the digital audio data 328.

In some embodiments, the capturing device 300 further comprises a video recording unit and being configured to encode recorded video into digital video data 502 and transmit the digital video data to the rendering device 400, wherein the rendering device 400 further comprises a display for displaying decoded digital video data.

As described above, a change of a position and/or the spatial orientation of the microphone system of the capturing device 300 during audio capturing may cause spatial rotation/translation of the rendered scene at the rendering device 400. Depending on the kind of provided experience, e.g. immersive, VR, AR or XR and depending on the specific use case, this behaviour may be desired or undesired. One example where this may be desired is when the service additionally provides a visual component 502 and where the capturing camera and the one or more microphones 302 are integrated in the same device. In that case, it should be expected that a rotation of the capturing device 300 should result in a corresponding rotation of the rendered audio-visual scene at the rendering device 400.

On the other hand, if the audio-visual capture is not done by the same physical device or in case there is no video component, it may be disturbing for a listener if the rendered scene rotates whenever the capturing device 300 rotates. In the worst case, motion sickness may be caused.

For this reason, according to some embodiments, the rendering unit of the rendering device 400 may be configured to, upon the rendering device 400 further receiving encoded video data 502 from the capturing device 300, modify a directional property of the directional audio (received in the digital audio data 328) using the spatial data and render the modified directional audio.

However, upon the rendering device 400 not receiving encoded video data from the capturing device 300, the rendering unit of the rendering device 400 may be configured to render the directional audio without any directional modification.

In other embodiments the rendering device 400 is informed before the conference that no video component will be included in the data received from the capturing device 300. In this case, the rendering device 400 may indicate in the instructions 334 that no spatial data of the microphone system of the capturing device 300 needs to be included in the digital audio data 328 at all, whereby the rendering unit of the rendering device 400 is configured to render the directional audio received in the digital audio data 328 without any directional modification.

In the above, downmixing and/or encoding of the directional audio on the capturing device has been briefly outlined. This will now be further elaborated on.

In many cases, the capturing device 300 does not have information as to whether the decoded presentation (at the rendering device) will be to a single mono speaker, stereo speakers, or headphones. The actual render scenario may also vary during a service session, for instance with connected playback equipment that may change, such as connection or disconnection of headphones to a mobile phone. Yet another scenario where rendering device capabilities are unknown is when a single capturing device 300 needs to support multiple endpoints (rendering devices 400). For instance, in an IVAS conference or VR content distribution use case, one endpoint might be using a headset and another might render to stereo speakers, yet it would be advantageous to be able to supply a single encode to both endpoints, as it would reduce complexity in the encode side and may also reduce required aggregate network bandwidth.

A straightforward though less desirable way to support these cases would be to always assume the lowest receive device capability, i.e. mono, and to select a corresponding audio operation mode. However, it is more sensible to require that the codec used (e.g. IVAS codec), even if operated in a presentation mode supporting spatial, binaural, or stereo audio can always produce a decoded audio signal that can be presented on devices 400 with respectively lower audio capability. In some embodiments, a signal encoded as a spatial audio signal may also be decodable for binaural, stereo, and/or mono render. Likewise, a signal encoded as binaural may be decodable as stereo or mono, and a signal encoded as stereo may be decodable for mono presentation. As an illustration, a capturing device 300 should only need to implement a single encode (digital audio data 328) and send the same encode to multiple endpoints 400, some of which may support binaural presentation and some of which may be stereo-only.

It should be noted that the codec discussed above may be implemented in the capturing device or in call server. In the call server case, the call server will receive the digital audio data 328 from the capturing device and do a transcoding of the digital audio data to meet the above requirements, before sending the transcoded digital audio data to the one or more rendering devices 400. Such scenario will now be exemplified in conjunction with FIG. 6.

Figure 6:
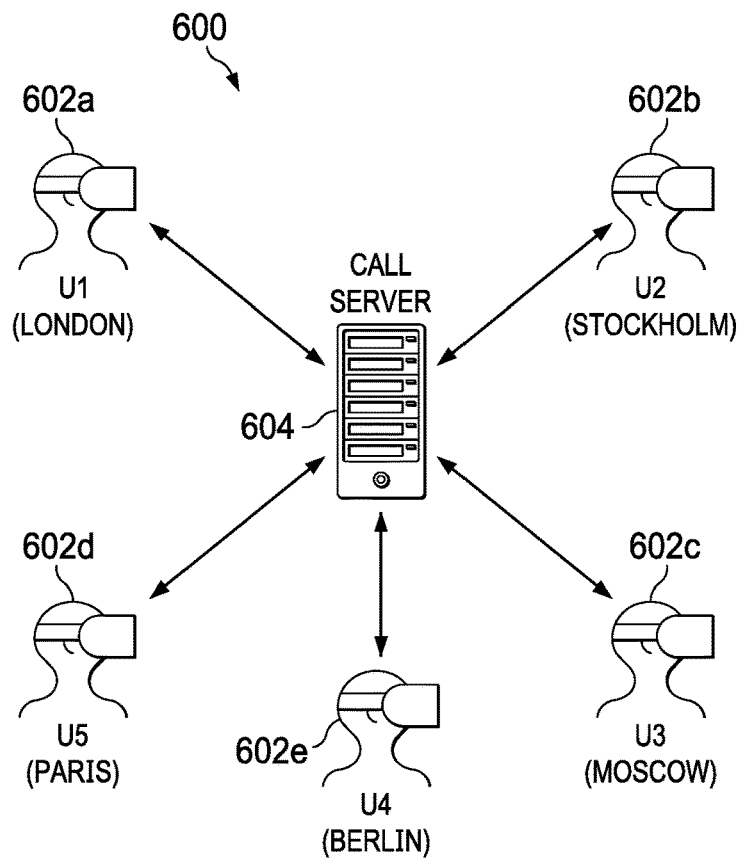
FIG. 6 shows a physical VR conference scenario according to embodiments.

The physical VR conference scenario 600 is illustrated in FIG. 6. Five VR/AR conference users 602a-e from different sites are virtually meeting. The VR/AR conference users 602a-e may be IVAS-enabled. Each of them is using VR/AR gear, including, for example, a binaural playback and video playback using an HMD. The equipment of all users supports movements in 6 DOF with corresponding head-tracking. The user equipment, UE, 602 of the users exchange coded audio up- and downstream with a conference call server 604. Visually, the users may be represented through respective avatars that can be rendered based on information related to relative position parameters and their rotational orientation.

To further improve the immersive user experience, also rotational movement and/or translational movement of a listener's head is considered when rendering the audio received from other participant(s) in the conference scenario. Consequently, the head-tracking informs the rendering unit of a user's rendering device (ref 400 in FIGS. 4-5) about the current spatial data (6 DOF) of the user's VR/AR gear. This spatial data is combined (e.g. through matrix multiplication or modification of metadata associated with directional audio) with spatial data received in the digital audio data received from another user 602, whereby the rendering unit is modifying a directional property of the directional audio received from said another user 602 based on the combination of spatial data. Then the modified directional audio is rendered to the user.

Furthermore, the volume of the rendered audio received from a specific user may be adjusted based on the spatial coordinates received in the digital audio data. Based on a virtual (or real) distance between the two users (calculated by the rendering device or by the call server 604), the volume may be increased or decreased to further improve the immersive user experience.

Figure 2:
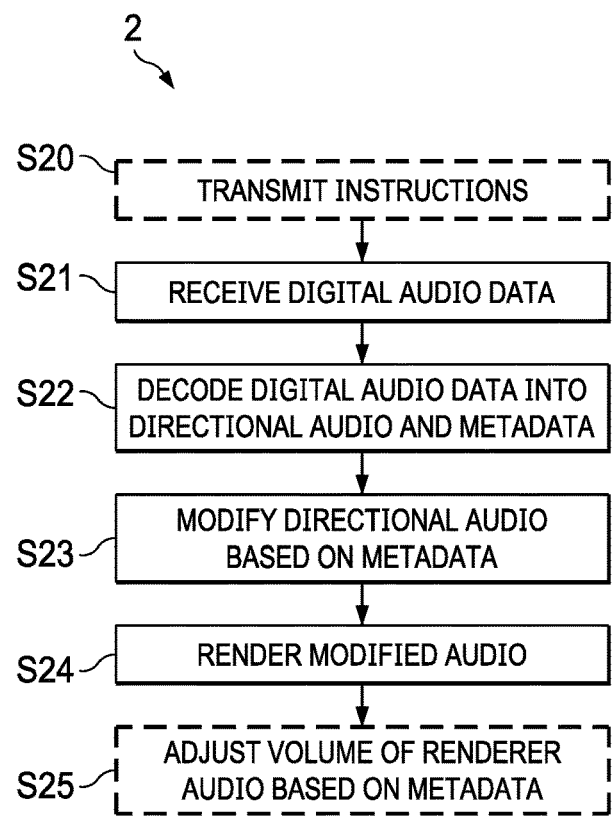
FIG. 2 shows a method for rendering directional audio according to embodiments.
Figure 7:
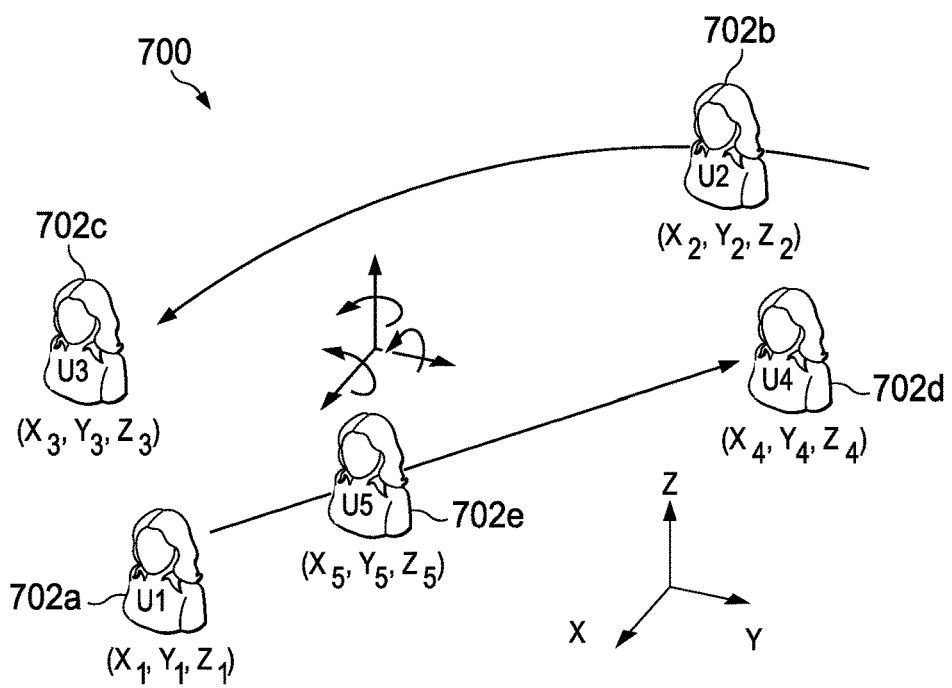
FIG. 7 shows a virtual conferencing space according to embodiments.

FIG. 7 illustrates by way of example a virtual conferencing space 700 generated by the conference call server. Initially, the server places the conference users Ui, i=1 . . . 5 (also referred to as 702a-e), at virtual position coordinates $K_i=(x_i, y_i, z_i)$. The virtual conferencing space is shared between the users. Accordingly, the audio-visual render for each user takes place in that space. For instance, from user U5's perspective (corresponding to user 602d in FIG. 6), the rendering will virtually place the other conference participants at the relative positions $K_i$-$K_5$, i≠5. For example, user U5 will perceive user U2 at distance |$K_i$-$K_5$| and under the direction of the vector ($K_i$-$K_5$)/|$K_i$-$K_5$|, whereby the directional render is done relative to the rotational position of U5. Also illustrated in FIG. 2 is the movement of U5 towards U4. This movement will affect the position of U5 relative to the other users, which will be taken into account while rendering. At the same time the UE of U5 sends its changing position to the conferencing server 604, which updates the virtual conferencing space with the new coordinates of U5. As the virtual conferencing space is shared, users U1-U4 become aware of moving user U5 and can accordingly adapt their respective renders. The simultaneous move of user U2 is working according to corresponding principles. The call server 604 is configured to maintain of participants 702a-e position data in shared meeting space In the scenario of FIG. 6-7, one or more of the following 6DOF requirements may apply to the coding framework when it comes to audio:

Offering a metadata framework for the representation and upstream transmission of positional information of a receive endpoint, including spatial coordinates and/or rotational coordinates (as described above in conjunction with FIGS. 1-4).

The capability to associate input audio elements (e.g. objects) with 6 DOF attributes, including spatial coordinates, rotational coordinates, directivity.

The capability of simultaneous spatial render of multiple received audio elements respective of their associated 6 DOF attributes.

Adequate adjustments of the rendered scene upon rotational and translational movements of the listener's head.

It should be noted that the above also applies to XR meetings, being a mix of a physical and a virtual meeting. The physical participants see and hear avatars representing the remote participants through their AR Glasses and headphones. They interact with the avatars in the discussions as if these were physically present participants. For them the interactions with other physical and virtual participants happen in a mixed reality. Real and virtual participant positions are merged into a combined shared virtual meeting space (e.g. by a call server 604) that is consistent with the positions of the real participant positions in the physical meeting space and mapped into the virtual meeting space using the absolute and relative physical/real position data.

In a VR/AR/XR scenario, subgroups of the virtual conference may be formed. Theses subgroups may be used to inform the call server 604 among which users e.g. the quality of service, QoS, should be high, and among which users QoS may be lower. In some embodiments, only participants in a same subgroup is included in a virtual environment provided to these subgroups via the VR/AR/XR gear. For example, a scenario where subgroups may be formed is a poster session that offers virtual participation from a remote location. Remote participants are equipped with HMD and headphones. They are virtually present and can walk from poster to poster. They can listen to ongoing poster presentations and move closer to a presentation if they think the topic or the ongoing discussion is interesting. To improve the possibility of immersive interactions between virtual and the physical participants, subgroups may be formed, for example based on which poster of the plurality of posters the participants are currently interested in.

Embodiments of this scenario comprises:

receiving, by a tele-conferencing system, topics from participants of a virtual conference;

grouping, by the tele-conferencing system based on the topics, the participants into subgroups of the virtual conference;

receiving, by the tele-conferencing system, a request from a device of a new participant to join the virtual conference, the request being associated with an indicator indicating a preferred topic;

selecting, by the tele-conferencing system, a subgroup from the subgroups based on the preferred topic and the topics of the subgroups;

providing, by the tele-conferencing system to the device of the new participant, a virtual environment of the virtual conference, the virtual environment indicating at least one of a visual virtual proximity or an audio virtual proximity between the new participant and one or more participants of the selected subgroup.

In some embodiments, the virtual environment indicates the visual virtual proximity or the audio virtual proximity at least by providing a virtual reality display or a virtual reality sound field where an avatar of the new participant and one or more avatars of the participants of the selected subgroup are in proximity of one another.

In some embodiments, each participant is connected by an open headphone and AR glasses.

VI—Equivalents, Extensions, Alternatives and Miscellaneous

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

All the figures are schematic and generally only show parts which are necessary in order to elucidate the disclosure, whereas other parts may be omitted or merely suggested. Unless otherwise indicated, like reference numerals refer to like parts in different figures.

The invention claimed is:

1. A device comprising or connected to a microphone system comprising one or more microphones for capturing audio, the device comprising:
    a receiving unit configured to:
        receive directional audio comprising one or more directional source signals captured by the microphone system;
        receive metadata associated with the microphone system, the metadata comprising spatial data of the microphone system, the spatial data being indicative of at least a spatial orientation and/or a spatial position of the microphone system and comprising at least one of a yaw or azimuth, pitch, roll angle(s), or spatial coordinates of the microphone system;
    a computing unit configured to:
        define a rotation/translation matrix based on the spatial data;
        modify at least some of the directional audio by multiplying the directional audio with the rotation/translation matrix to produce modified directional audio, wherein a directional property of the directional audio is modified in response to the spatial data of the microphone system;
        encode the modified directional audio into digital audio data; and
    a transmitting unit configured to transmit the digital audio data.

2. The device according to claim 1, wherein the spatial orientation of the microphone system is represented with parameters describing rotational movement/orientation with one degree of freedom (DoF) in the spatial data.

3. The device according to claim 1, wherein the spatial orientation of the microphone system is represented with parameters describing rotational movement/orientation with three DoF in the spatial data.

4. The device according to claim 1, wherein the spatial data of the microphone system is represented in six DoF.

5. The device according to claim 1, wherein the received directional audio comprises audio comprising directional metadata.

6. The device according to claim 1, wherein the computing unit is further configured to encode at least parts of the metadata comprising the spatial data of the microphone system into said digital audio data;
    wherein the transmitting unit is configured to transmit the digital audio data comprising the metadata.

7. The device according to claim 6, wherein the receiving unit is further configured to receive first instructions indicating to the computing unit whether to include said at least parts of the metadata comprising the spatial data of the microphone system into said digital audio data, whereby the computing unit acts accordingly.

8. The device according to claim 6, wherein the receiving unit is further configured to receive second instructions indicating to the computing unit which parameter or parameters of the spatial data of the microphone system to include in the digital audio data, whereby the computing unit acts accordingly.

9. The device according to claim 7, wherein the transmitting unit is configured to transmit the digital audio data to a further device, wherein indications about first and/or second instructions are received from said further device.

10. The device according to claim 1, wherein the receiving unit is further configured to receive the metadata comprising a time stamp indicating a capturing time of the directional audio, wherein the computing unit is configured to encode said time stamp into said digital audio data.

11. The device according to claim 1, wherein the computing unit is further configured to:
    downmix the modified directional audio based on the spatial data of the microphone system using a downmix matrix; and
    encoding the downmixed directional audio and the downmix matrix into the digital audio data,
    wherein the downmixing comprises adjusting a beamforming operation of the modified directional audio based on the spatial data of the microphone system.

12. The device according to claim 1, wherein the device is implemented in a virtual reality (VR) gear or an augmented reality (AR) gear comprising the microphone system and a head-tracking device configured to determine the spatial data of the device in 3-6 DoF.

13. A device for rendering audio signals, the device comprising:
a receiving unit configured to receive digital audio data;
a decoding unit configured to:
decode the received digital audio data into directional audio and metadata, the metadata comprising spatial data indicative of at least a spatial orientation and/or a spatial position of a microphone system; and
a rendering unit configured to:
define a rotation/translation matrix based on the spatial data;
modify a directional property of the directional audio by multiplying the directional audio with the rotation/translation matrix; and
render the modified directional audio.

14. The device according to claim 13, wherein the microphone system comprising one or more microphones capturing the directional audio, wherein the rendering unit modifies the directional property of the directional audio to at least partly reproduce an audio environment of the microphone system.

15. The device according to claim 13, wherein the spatial data comprises parameters describing rotational movement/orientation with one degree of freedom; (DoF).

16. The device according to claim 13, wherein the spatial data comprises parameters describing rotational movement/orientation with three DoF.

17. The device according to claim 13, wherein the directional audio comprises audio comprising directional metadata.

18. The device according to claim 13, further comprising a transmitting unit configured to transmit instructions to a further device from which the digital audio data is received, the instructions indicating to the further device which parameter or parameters rotational data should comprise.

19. The device according to claim 13, wherein the decoding unit is further configured to extract a time stamp indicating a capturing time of the directional audio from the digital audio data.

20. The device according to claim 13, wherein the spatial data includes spatial coordinates and wherein the rendering unit is further configured to adjust a volume of the rendered audio based on the spatial coordinates.

21. The device according to claim 13, being implemented in a virtual reality; (VR) gear or an augmented reality (AR) gear comprising a head-tracking device configured to measure the spatial orientation and the spatial position of the device in six DoF.

22. The device according to claim 13, wherein the rendering unit is configured for binaural audio rendering.

23. A system comprising:
a first device according to claim 1 configured to transmit digital audio data to a second device according to claim 13, wherein the system is configured for audio and/or video conferencing.

24. The system according to claim 23, wherein the first device further comprises a video recording unit and being configured to encode recorded video into digital video data and transmit the digital video data to the second device, wherein the second device further comprises a display for displaying decoded digital video data.

25. A system comprising a first device according to claim 1 configured to transmit digital audio data to a second device, the second device comprising:
a receiving unit configured to receive the digital audio data,
a decoding unit configured to:
decode the received digital audio data into directional audio and into metadata, the metadata comprising spatial data comprising at least one from the list of: a yaw or azimuth, pitch, roll angle(s) and spatial coordinates;
a rendering unit for rendering audio;
wherein the rendering unit is configured to, upon the second device further receiving encoded video data from the first device:
modify a directional property of the directional audio using the spatial data, and
render the modified directional audio;
wherein the rendering unit is configured to, upon the second device not receiving the encoded video data from the first device:
render the directional audio.

26. A non-transitory computer-readable medium storing instructions that, when executed by one or more processors, cause the one or more processors to perform operations comprising:
receiving directional audio comprising one or more directional source signals from a microphone system comprising one or more microphones;
receiving metadata associated with the microphone system, the metadata comprising spatial data of the microphone system, the spatial data being indicative of at least a spatial orientation and/or a spatial position of the microphone system and comprising at least one of a yaw or azimuth, pitch, roll angle(s), or spatial coordinates of the microphone system;
defining a rotation/translation matrix based on the spatial data;
modifying at least a portion of the directional audio by multiplying the directional audio with the rotation/translation matrix to produce modified directional audio, wherein a directional property of the directional audio is modified in response to the spatial data of the microphone system;
encoding the modified directional audio into digital audio data; and
transmitting the digital audio data.

27. The device according to claim 13, wherein decoding the received digital audio data into directional audio configures the decoding unit to:
decode the received digital audio data into downmixed audio, a downmix matrix, and the metadata; and
up mix the downmixed audio into the directional audio using the downmix matrix.

28. The device according to claim 14, wherein the rendering unit modifies the directional property of the directional audio comprises reapplying at least a part of acoustic scene rotation that was compensated at a capturing device comprising the microphone system.

* * * * *